Sept. 3, 1963  K. SCHULLER  3,102,436

THREE-SPEED COASTER BRAKE

Filed Oct. 26, 1961  2 Sheets-Sheet 1

INVENTOR:
KURT SCHULLER by Squire + Olcott

Att'ys.

INVENTOR:
KURT SCHULLER 3,102,436
THREE-SPEED COASTER BRAKE
Kurt Schuller, Schweinfurt (Main), Germany, assignor to Fichtel & Sachs A.G., Schweinfurt (Main), Germany
Filed Oct. 26, 1961, Ser. No. 147,827
Claims priority, application Germany Oct. 27, 1960
5 Claims. (Cl. 74—750)

The present invention relates to multi-speed coaster brakes and more particularly to improved means for engaging and disengaging the driving pawl mechanism which is operative both in high speed and normal speed but must be rendered inoperative during operation in low speed.

Briefly, the invention comprises an axially displaceable coupling member which connects a drive ring member having internal ratchet teeth to drive the hub of the coaster brake during high speed and during normal speed operation but which frees the drive ring member during low speed operation when the ring gear member rotates in the forward direction faster than the hub. The ratchet teeth of the drive ring member are continuously engaged by pawls carried by the ring gear member. The angular play between the hub and the drive ring member which is required to prevent brake locking, as well as the selective disengagement of the drive ring member are both obtained by the use of a single two-armed coupling member which requires no additional space. As a result, a marked reduction in size is obtained by use of the novel coupling member as compared with previous arrangements for disengagement of the pawls of the ring gear member.

The invention will be better understood from the following specification, reference being had to the accompanying drawing forming a part hereof.

Referring to the drawing.

Figure 1:
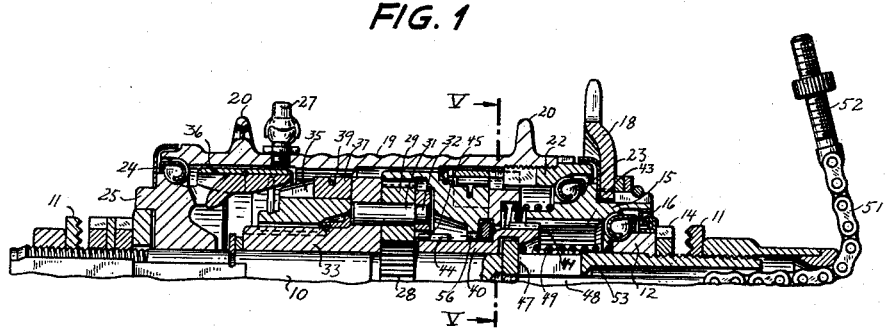
FIGURE 1 is a view in axial section of a three-speed coaster brake embodying the invention, the lower half being omitted for simplicity of illustration, the parts being positioned for high speed operation.

A fixed axle 10 is adapted to be secured to the frame of a bicycle (not shown) by serrated nuts 11. An inner ball bearing race member 12 is secured on the axle 10 by a lock nut 14. A drive member 15 is freely revoluble on bearing balls 16 carried by the inner race member 12. A sprocket 18 is fast on the drive member 15. The sprocket 18 is driven by the usual bicycle chain (not shown).

The hub barrel 19 is provided with flanges 20 which receive the inner ends of the spokes (not shown) of the bicycle wheel. At its right hand end, the barrel 19 is fixed to a cylindrical sleeve 22. The sleeve 22 is freely revolubly supported on the drive member 15 by bearing balls 23. At its left hand end, the barrel 19 is freely revolubly supported by bearing balls 24 on a fixed brake member 25. The barrel 19 is provided with an oil cup 27 for the injection of lubricant into the coaster brake mechanism.

A sun gear 28 is provided by teeth integrally formed on the axle 10. The sun gear 28 is in continuous meshing engagement with a series of planet gears 29. Each planet gear 29 is individually freely revolubly mounted on a pin 31. An internally toothed ring member 32 is fixed to the free ends of all of the pins 31 and holds all of the planet gears 29 against axial displacement toward the right. All of the pins 31 are fixedly mounted on a planet carrier 33. The planet carrier 33 is freely revoluble on the axle 10. An axially displaceable brake cone member 35 is mounted on the planet carrier 33. Upon reverse rotation of the planet carrier 33, the brake cone 35 moves leftwardly and expands a brake ring 36 which is held against rotation by the fixed brake member 25. A pawl carrier ring 37 is supported by the brake cone member 35 and rotates in the forward direction along with the planet carrier 33. The free ends of radially outwardly spring-pressed pawls of the pawl carrier ring 37 engage radially inwardly projecting ratchet teeth 39 formed on the internal surface of the hub barrel 19 for driving the hub during low speed operation. Upon forward rotation of the pawl carrier ring 37, the brake 35, 36 is released.

An axially displaceable coupling sleeve 40 is freely revolubly mounted on the axle 10. At its right hand end, the coupling sleeve 40 is provided with external teeth 41 which continuously engage complementary internal spline teeth 43 formed on the drive member 15. At its left hand end, the coupling sleeve 40 is provided with external teeth 44. In FIG. 1, the teeth 44 are shown in engagement with internal teeth 45 formed in the ring member 32 to drive the planet carrier 33.

An axially displaceable block 47 is threadedly secured to one end of a control rod 48. The block 47 is freely slidable in a transversely extending longitudinal slot 49 formed in the axle 10. The axial position of control rod 48 is changed by a chain 51 which extends to a threaded rod 52 which is displaced by a conventional control device (not shown). The block 47 is yieldingly urged toward the left by a helical compression spring 53. It may be pulled toward the right against the action of spring 53 by chain 51. The free ends of the block 47 which protrude beyond the edges of the slot 49 are freely slidably received in an annular groove 55 formed on the internal surface of the coupling sleeve 40. The axial position of the coupling sleeve 40 is thus controlled by the block 47, control rod 48 and chain 51.

Figure 5:
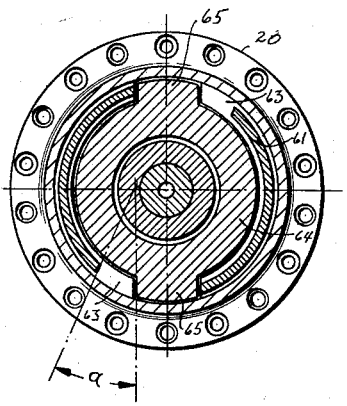
FIGURE 5 is a transverse sectional view taken along the line V—V of FIG. 1.

The planet gears 29 are in continuous meshing engagement with internal teeth 56 formed on a ring gear member 57. The ring gear member 57 is freely revoluble on the axle 10 and is suitably held against axial displacement. The ring gear member 57 includes a pawl carrier portion 59 which is provided with radially outwardly spring-pressed pawls the free ends of which engage radially inwardly projecting internal ratchet teeth 60 formed on a drive ring member 61. The drive ring member 61 is freely revolubly supported concentrically with the axle 10 and is suitably held against axial movement. The right hand edge of the drive ring member 61 is provided with diametrically opposed axially extending recesses 63 (FIG. 5). An axially displaceable coupling member 64 is freely revoluble concentrically with the axle 10. The coupling member 64 is provided with two diametrically opposed radially extending arms 65 which are received in the recesses 63 of drive ring member 61 with an angular amount of play designated by the angle α in FIG. 5.

The two-armed coupling member 64 is yieldingly urged leftwardly by a helical compression spring 67 so that the arms 65 are retained in the recesses 63 during high speed (FIG. 1) and normal speed (FIG. 2) operation. The sleeve 22, which is fixed to the barrel 19, has axially extending recesses 68 formed therein in which the arms 65 and the coupling member 64 are axially slidably received without appreciable angular or rotational play. The two-armed coupling member 64 and the hub barrel 19 thus rotate at all times as a unit. However, there is always angular play through the angle α between the two-armed coupling member 64 and the drive ring member 61 when the coupling member 64 is engaged in the recesses 63.

Figure 3:
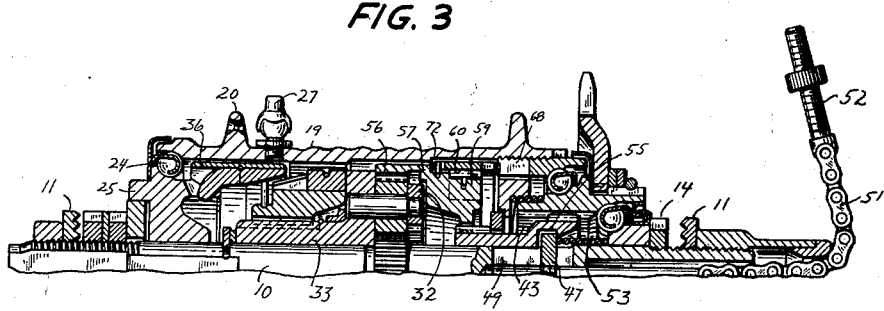
FIGURE 3 is similar to FIG. 1 showing the parts positioned for low speed operation.

An axially displaceable washer 69 is freely revolubly slidable intermediate the ends of the coupling sleeve 40 and is engageable by the right hand end surfaces of the external teeth 41 on sleeve 40 to be forced toward the right. Except in low speed operation, the washer 69 is located within an annular recess 71 formed partly in the ring gear member 57 and partly in the two-armed coupling member 64. When the coupling sleeve 40 is pulled to its extreme right hand position for low gear operation, as shown in FIG. 3, the end surfaces of the external teeth 41 thrust the washer 69 toward the right and this movement forces the two-armed coupling member 64 toward the right against the action of the compression spring 67. The arms 65 of the coupling member 64 are then disengaged from the recesses 63 in the drive ring member 61 and the hub barrel 19 can no longer be driven by the fast moving pawls of the pawl carrier portion 59 of the ring gear member 57. Accordingly, the relatively slow moving pawls of the pawl carrier ring 37 which rotate with the planet carrier 33 overtake and engage the ratchet teeth 39 in hub barrel 19 for low speed drive.

A friction spring 72 couples the ring gear member 57 to the drive ring member 61. When the hub overruns the ring gear member 57 during coasting prior to braking, the friction spring 72 holds back the drive ring member against rotation with the two-armed coupling member 64 until the angle of play α has first been taken up. The action of the spring 72 positively provides sufficient play to permit rotation of the planet carrier 33 in the forward direction under all circumstances by an amount sufficient to unlock the brake 35, 36 regardless of the relative positions of the pawls and ratchet teeth at the time when the brake stops further forward rotation of the hub barrel 19.

In coasting, or upon rearward pedaling, the entire planetary gearing 29, 33, 57 remains stationary while the hub barrel sleeve 19, the sleeve 22 and the two-armed coupling member 64 rotate. The driving ring 61 is prevented from rotating along with the hub barrel 19 by the friction spring 72 until the play or lost motion (angle α) between the two-armed coupling member 64 and the driving ring 61 in the forward direction of rotation has been taken up. If the lost motion angle α is greater than the pitch angle between adjacent ratchet teeth 39 used for low speed drive, then the bicycle can be pushed backward after full braking without danger of locking the brake. When the bicycle is pushed backward, the low speed ratchet teeth 39 and pawl carrier ring 37 do not come into engagement, until after the lost motion angle α in the rearward direction of rotation has been taken up and the brakes 35, 36 has been released.

On the other hand, if the condition that the lost motion angle α be at least greater than the pitch angle of the low speed ratchet teeth 39 were not fulfilled, then upon rearward displacement, following braking, a locking of the brake could take place as follows: The brake cone 35 due to the previous braking is in engagement with the brake ring 36. When the wheel is pushed back against the friction thereby produced, the hub barrel 19 together with the driving ring 61 will rotate backwards as a unit. If this driving ring immediately comes into engagement with the pawl carrier portion 59 of the ring gear member 57, then upon further turning, the ring gear member 57 will also be turned backward in exactly the same manner as by backward pedaling for braking, and the brake would therefore be re-applied with increased force and locking will occur. On the other hand, if the low speed ratchet teeth 39 first come into engagement with pawl carrier ring 37, as is always the case if the indicated condition is fulfilled, the brake will be disengaged before locking can occur.

The operation of the coaster brake is as follows:

High Speed

As shown in FIG. 1, the coupling sleeve 40 connects the drive member 15 to drive the ring 32 of the planet carrier 33. The planet gears 29 therefore drive the ring gear member 57 at an increased speed with respect to the sprocket wheel 18. The low speed ratchet teeth 39 overrun the pawl carrier ring 37. The pawls of the pawl carrier portion 59 of ring gear member 57 engage the ratchet teeth 60 of the drive ring member 61. The drive ring member 61 is in engagement with the two-armed coupling member 64 which, in turn, drives the hub barrel 19 through the sleeve 22.

Normal Speed

Figure 2:
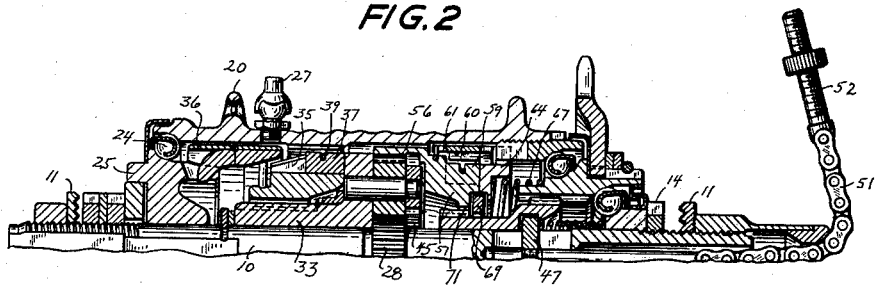
FIGURE 2 is similar to FIG. 1 showing the parts positioned for normal speed operation.

The coupling sleeve 40 is displaced to its intermediate position as shown in FIG. 2. The teeth 41 on coupling sleeve 40 now engage complementary internal teeth 56 of ring gear member 57, being disconnected from the planet carrier 33. There is a direct drive without intervening gearing between the sprocket wheel 18 and the hub barrel 19. The operation of the drive ring member 61 and two-armed coupling member 64 remains unchanged and is the same as for FIG. 1. The planet gears 29 idle about the sun gear 28.

Low Speed

The coupling sleeve 40 is moved to its extreme right hand position as shown in FIG. 3. The drive member 15 remains connected to drive the ring gear member 57. The two-armed coupling member 64, however, is displaced toward the right so that its arms 65 are withdrawn from the recesses 63 in drive ring member 61. Accordingly, the drive ring member 61 is idle and the planet carrier 33 is driven at low speed by the ring gear member 57. The pawls of the pawl carrier ring 37, which rotates forwardly with the planet carrier 33, engage the low speed ratchet teeth 39 and thus drive the hub barrel 19 at low speed.

Figure 4:
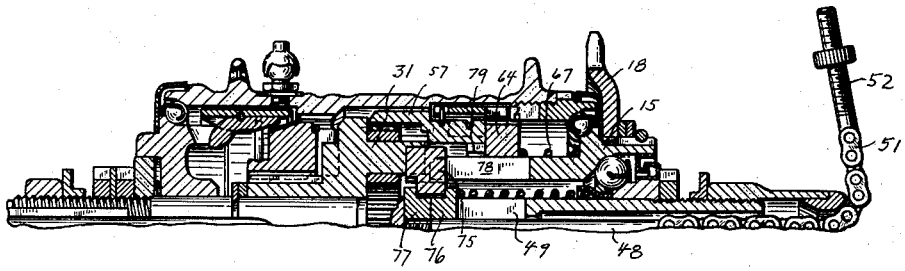
FIGURE 4 illustrates a modified form of construction wherein a coupling sleeve used in FIGS. 1, 2 and 3 is replaced by an axially displaceable drive member.

FIG. 4 shows a modification of the arrangement of FIGS. 1 through 3 in which the coupling sleeve 40 has been replaced by a two-armed drive dog 75. The drive dog 75 is freely revolubly mounted on guide blocks 76, 77 which control the axial position of the drive dog 75. The blocks 76, 77 which protrude beyond the edges of slot 49 may be pulled to the right by control rod 48 against the yielding action of compression spring 53. The drive dog 75 is axially slidable in slots 78 formed in the drive member 15. The drive dog 75 rotates as a unit with the sprocket wheel 18 at all times.

In high speed operation, as shown in FIG. 4, the drive dog 75 engages the free ends of the pins 31 on which the planet gears 29 are mounted. The planet carrier 33 is thus driven by the sprocket wheel 18 as in the case of FIG. 1.

For normal speed operation, the drive dog 75 is shifted to an intermediate position where it engages radially inwardly extending projections 79 formed on ring gear member 57. The ring gear member 57 is thus driven directly without intervening gearing as in FIG. 2.

For low speed drive, the drive dog 75 is displaced to its extreme right position where it moves the two-armed coupling member 64 toward the right, thereby withdrawing the arms 65 axially outwardly from the recesses 63. The drive dog 75 remains in engagement with projections 79 on ring gear member 57 so that low speed operation is obtained as described above.

While I have shown and described what I believe to be the best embodiments of my invention, it will be apparent to those skilled in the art that various changes and modifications may be made therein without departing from the spirit and scope of the invention as defined in the appended claims.

What is claimed is:

1. In a three-speed coaster brake, an axle member 10, an externally toothed sun gear member 28 fixed with respect to said axle member coaxially therewith, a planet carrier 33 freely revoluble coaxially with said axle member, a plurality of planet gears 29 carried by said planet carrier in continuous meshing engagement with said sun gear member, an internally toothed ring gear member 57 surrounding said planet gears in continuous meshing engagement therewith, a hub barrel member 19 freely revolubly surrounding said planet carrier and ring gear member coaxially with said axle member, brake means 35, 36 acting on said barrel member in response to reverse rotation of said planet carrier, first pawl carrier means 37 mounted for forward rotation with said planet carrier, a series of radially inwardly projecting internal ratchet teeth 39 formed on said hub barrel member, a first plurality of radially outwardly spring-pressed pawl members carried by said first pawl carrier means, said pawl members being engageable with said ratchet teeth for forward driving of said hub barrel member by said first pawl carrier means, forward rotation of said first pawl carrier means releasing said brake means, a sprocket member 18 for driving said coaster brake, a first axially displaceable coupling member 40 connected in continuous driving relationship to be driven by said sprocket member, means 47, 48, 49 for displacing said first coupling member for selective driving engagement either with said planet carrier or said ring gear member for high speed and normal speed operation, respectively, second pawl carrier means 59 included in said ring gear member, a drive ring member 61 freely revoluble concentrically with said axle member, said drive ring member having internal ratchet teeth 60 formed thereon, a second plurality of radially outwardly spring-pressed pawl members carried by said second pawl carrier means, said last-named pawl members being engageable with said ratchet teeth of said drive ring member for forward driving of said second pawl carrier means, and a second axially displaceable coupling member 64 connected in continuous driving relationship with respect to said hub barrel member, said drive ring member being selectively engageable and disengageable by said second coupling member by axial displacement thereof, said first coupling member being displaceable to disengage said second coupling member from said drive ring member while remaining in driving engagement with said ring gear member for providing low speed operation.

2. A coaster brake according to claim 1, wherein said drive ring member has at least one open-ended axially extending aperture 63 formed therein, said second coupling member being provided with at least one arm 65 which may be selectively received in or removed from said aperture by axial displacement of said first coupling member.

3. A coaster brake according to claim 2, wherein there is angular play (angle $\alpha$) between said arm and said recess to an extent which is greater than the angular pitch between adjacent ones of said ratchet teeth 39 on said hub barrel member 19.

4. A coaster brake according to claim 1, wherein when said second coupling member 64 is in engagement with said drive ring member 61 there is angular play therebetween to an extent (angle $\alpha$) which is greater than the angular pitch between any adjacent ones of said ratchet teeth 39, 60 on said hub barrel member 19, said coaster brake further comprising means 72 frictionally coupling said ring gear member 57 to said drive ring member 61 for positively taking up said angular play during coasting prior to braking, whereby said angular play will be available for brake disengagement regardless of the relative positions of any of said pawls with respect to any of said ratchet teeth.

5. A coaster brake according to claim 1, wherein said second coupling member 64 comprises a plurality of radially extending arms 65, said coaster brake further comprising means 22 defining recesses for the simultaneous reception of said arms for continuous driving by said sprocket member 18 in all positions of axial displacement of said second coupling member 64.

References Cited in the file of this patent
FOREIGN PATENTS
749,248    Great Britain _____ May 23, 1956